United States Patent
Okuda et al.

(10) Patent No.: US 8,075,379 B2
(45) Date of Patent: Dec. 13, 2011

(54) GAME DEVICE WITH CHEATING PREVENTION FUNCTION, AND METHOD AND PROGRAM FOR PREVENTING CHEATING DURING A GAME

(75) Inventors: Nobuya Okuda, Kobe (JP); Tadasu Kitae, Nishinomiya (JP); Shohei Shimokawa, Kakogawa (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 710 days.

(21) Appl. No.: 12/186,732

(22) Filed: Aug. 6, 2008

(65) Prior Publication Data

US 2009/0036201 A1    Feb. 5, 2009

Related U.S. Application Data

(63) Continuation of application No. PCT/JP2007/050887, filed on Jan. 22, 2007.

(30) Foreign Application Priority Data

Feb. 8, 2006    (JP) ................................. 2006-030990

(51) Int. Cl.
  *A63F 9/24* (2006.01)
(52) U.S. Cl. ......................................................... 463/7
(58) Field of Classification Search ..................... 463/23, 463/4, 7
  See application file for complete search history.

(56) References Cited

U.S. PATENT DOCUMENTS

| 7,367,887 | B2 * | 5/2008 | Watabe et al. .................. 463/36 |
| 2003/0211877 | A1 * | 11/2003 | Yamada ............................ 463/9 |
| 2005/0187023 | A1 | 8/2005 | Miyamoto et al. |
| 2007/0066403 | A1 * | 3/2007 | Conkwright .................... 463/43 |

FOREIGN PATENT DOCUMENTS

| JP | H07-275507 A | 10/1995 |
| JP | H07-275509 A | 10/1995 |
| JP | H08-238383 A | 9/1996 |
| JP | H09-108438 A | 4/1997 |
| JP | 2000-202158 A | 7/2000 |
| JP | 2004-313335 A | 11/2004 |
| JP | 2005-230460 A | 9/2005 |
| TW | 592763 B | 6/2004 |

* cited by examiner

*Primary Examiner* — Omkar Deodhar
(74) *Attorney, Agent, or Firm* — Global IP Counselors, LLP (57) ABSTRACT

In a game device that can be played by a plurality of players at the same time, playing of a game by more than the plurality of players assumed to be playing the game device is prevented. A setting for a number of a plurality of players to participate in the game is received and the game takes place using the set number of the plurality of players. The players constituting the plurality of players participating in the game is then detected during the game. The detected number of the players and the set number of the players are then compared, and the difficulty level of the game is changed when the detected number of players exceeds the set number of players. For example, continuation of the game is made difficult by increasing the difficulty level, and the time for which a cheating can take place is shortened. Further, the game can be made less interesting by lowering the difficulty level, and the time for which a cheating can take place can be made shorter.

7 Claims, 10 Drawing Sheets

| REFERENCE NUMBER OF HITS/MINUTE | NUMBER OF PLAYERS |
|---|---|
| LESS THAN L1 | ONE PERSON |
| GREATER THAN OR EQUAL TO L1 AND LESS THAN L2 | TWO PEOPLE |
| GREATER THAN OR EQUAL TO L2 AND LESS THAN L3 | THREE PEOPLE |
| GREATER THAN OR EQUAL TO L3 AND LESS THAN L4 | FOUR PEOPLE |
| GREATER THAN OR EQUAL TO L4 | FIVE PEOPLE OR MORE |

FIG. 7

| COMPARISON RESULTS | LIFT SPEED |
|---|---|
| (NUMBER OF PLAYERS) LESS THAN OR EQUAL TO (SET NUMBER OF PEOPLE) | V1 |
| (NUMBER OF PLAYERS) > (SET NUMBER OF PEOPLE) | V2 |

GAME DEVICE WITH CHEATING PREVENTION FUNCTION, AND METHOD AND PROGRAM FOR PREVENTING CHEATING DURING A GAME

TECHNICAL FIELD

The present invention relates to a game device where one game can be enjoyed by a plurality of players at the same time.

BACKGROUND ART

For example, throwing games and "whack a mole" games can be given as games where a plurality of players can enjoy a game together. With throwing games, a player aims at a target depicted on a monitor and throws a predetermined real object, for example, a ball. Whether or not the ball has hit the target is then determined based on a position where the ball hits the monitor and a position of the target within a game space at this time.

Figure 11:
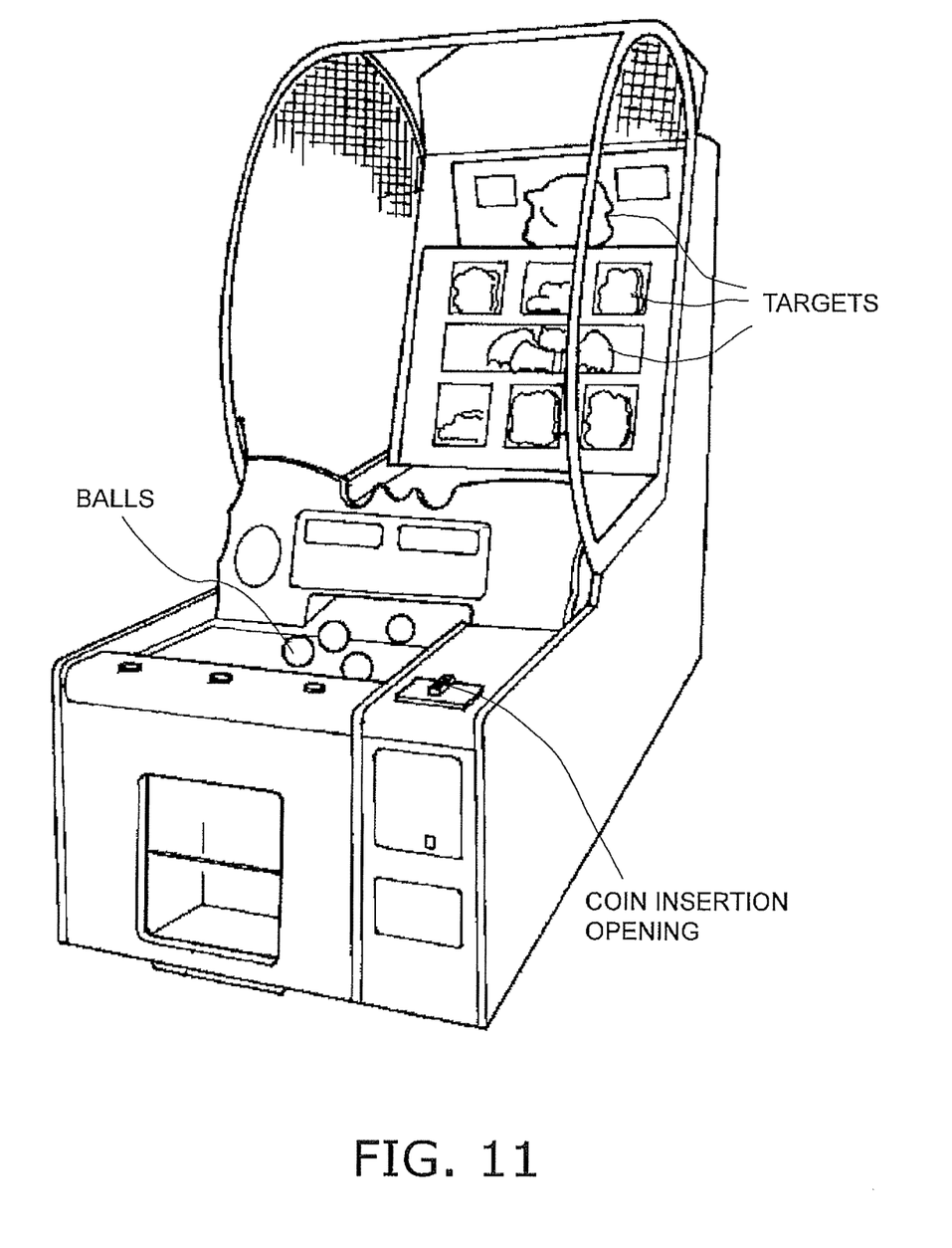
FIG. 11 is an exterior perspective view of a throwing game of the related art.

FIG. 11 is a perspective view of an example of a game device that executes a throwing game. The player aims and throws balls constituting a real object at a target located to the back of a case. The thrown balls then rebounds, are collected at one place, and are brought back to the players hand once again. A plurality of players can play this throwing game together at the same time or the game can also be enjoyed by just one player.

Patent Citation 1: Japanese Patent Publication Laid-open No. Hei. 9-108438.

DISCLOSURE OF INVENTION

With the throwing game equipment shown in FIG. 11, anybody can take out the balls. This means that if the fee to play one time is paid, a plurality of players can take out the balls and enjoy throwing the balls.

However, when a plurality of players greater than anticipated participate in the game, the difficulty level of the game falls relatively. For example, when the fee to play one time is invested and the targets are displayed one after another at the monitor, when a plurality of players participate in the game, the game is easier than when just one player plays the game. It is therefore possible for the set game stages to be cleared one after another. It then becomes easier for each player to take aim at the targets one by one because the plurality of targets for one player falls. The time the game can be played for paying an initial play fee is then extended for longer than assumed. This is because a game that was originally intended for just one player is being played by a plurality of players. This can be considered to be a kind of cheating.

An object of the present invention is to provide technology for a game device that prevents a game from being played by more than a plurality of players assumed for the game device which enables the plurality of players to join the game together.

In order to solve these problems, a first aspect of the invention provides a game device with a cheating prevention function where a plurality of players can participate in a game together. The game device has the following elements.

A players-setting unit that receives a setting for a number of the plurality of players that are to participate in the game.

A game-execution unit that executes the game using the set number of the plurality of players received by the players-setting unit.

A players-detection unit that detects a number of players constituting the plurality of players participating in the game.

A difficulty-level-control unit that compares the number of the plurality of players detected by the players-detection unit and the set number of the plurality of players and controls the difficulty level of the game.

The difficulty level is controlled according to the detected number of the plurality of players. This means that the time per unit price that the plurality of cheating players can continue the game for can be made short. For example, when the number of a plurality of players greater than the set number is detected, the difficulty level can be increased. As a result, the time period for which the players can play the game unfairly can be made shorter Here, setting of the number of the plurality of players can be carried out using the plurality of coins that are put in or from explicit instructions given by the players for the set number.

A second aspect of the present invention provides a game device with a cheating prevention function according to the first aspect, wherein the game device is connected with a supply unit. The supply unit supplies real objects used by the plurality of players during the game to the plurality of players. The difficulty-level-control unit in this device sends a supply-amount-control command that controls an amount of the real objects supplied to the supply unit in accordance with the comparison results. The supply unit supplies the amount of real objects according to the supply-amount-control command from the difficulty-level-control unit.

For example, when a number of a plurality of players greater than the set number is detected, the amount of real objects supplied is reduced. As a result, in order to increase the difficulty level for the player, the time period during which the game can be continued using the paid initial fee is made short and the time that the cheating can take place for is shortened.

Here, it is possible to give a throwing game and a bowling game as games where a player repeatedly causes a real object to move during the game. A thrown item such as, for example, a ball can be given as a real object.

A plurality of real objects supplied corresponds to a type of handicap. It is therefore also possible to control the difficulty level by changing a handicap. For example, it is possible to impose a handicap by reducing the initial value for the plurality of lives provided to a player or by increasing the speed of targets to be hit by the real objects.

A third aspect of the present invention provides a game device with a cheating prevention function according to the first aspect, wherein the game-execution unit stores a quota imposed on the players and proceeds with the game based on the quota. With this device, the difficulty-level-control unit sends a quota change command instructing change of the set quota to the game-execution unit in accordance with the comparison results. The game-execution unit then changes the quota as the game progresses according to the quota change command.

For example, if the game is a throwing game, reaching of a quota is avoided by increasing the plurality of targets to be hit by real objects. As a result, it becomes difficult for cheating players to continue the game for the same fee and the time for cheating is shortened.

Here, as one example of a quota, conditions for clearing each game stage can be given as an example of a quota when a plurality of game stages are set within one game. For example, this game device can be applied to sports games and sword games, throwing games and "whack a mole" games.

Making a lowest quota corresponding to a type of handicap and controlling the difficulty level according to the handicap are the same as for the second aspect.

A fourth aspect of the present invention provides a game device with a cheating prevention function according to the first aspect, wherein the game-execution unit determines whether or not game objects moving within the game space displayed on the monitor are hit by real objects operated by the plurality of players during the game. The difficulty-level-control unit in this device sends a speed-change-command instructing changing of a speed of movement of the game objects to the game-execution unit in accordance with the comparison results. The game-execution unit then changes the speed of movement of the game objects according to the speed-change-command.

For example, when a number of a plurality of players greater than the set number is detected, the speed the game objects move at is increased. As a result, it becomes difficult for a cheating player to hit a game object with a real object and the difficulty level is increased. As a result, the game continuation time per unit price is shortened. For example, this game device can be applied to sports games, sword games, and throwing games.

Making the speed of movement of the game objects corresponding to a type of handicap and controlling the difficulty level according to the handicap are the same as for the second aspect.

A fifth aspect of the present invention provides the game device with a cheating prevention function according to the first aspect, wherein the game-execution unit determines whether or not game objects within the game space displayed on the monitor are hit by real objects operated by the plurality of players during the game to a predetermined degree of accuracy. With this device, the difficulty-level-control unit sends an accuracy-change command instructing to change the accuracy to the game-execution unit in accordance with the comparison results. The game-execution unit then changes the accuracy of the hit determination according to the accuracy-change command from the difficulty-level-control unit.

When a number of a plurality of players greater than the set number is detected, the accuracy of the hit determination is increased. As a result, it becomes difficult for cheating players to hit a target with the real objects and the difficulty level is increased. As a result, the time the game continues for the same fee is made shorter. For example, sports games, sword games, and throwing games can be applied to this game device.

Making the hit determination accuracy corresponding to a type of handicap and controlling the difficulty level according to the handicap are the same as for the second aspect.

A sixth aspect of the present invention provides a game device with a cheating prevention function according to the first aspect, wherein the game-execution unit determines whether or not the game objects are hit by the real objects based on positions where game objects within the game space are displayed on the monitor, and positions where real objects operated by the plurality of players hit the monitor during the game. At this device, the players-detection unit has a measuring unit and a player-deciding unit. The measuring unit measures a plurality of hits per unit time for the real objects that hit the monitor. The players-deciding unit decides the number of the plurality of players operating the real objects based on the measurement results of the measuring unit and a reference hits per unit time.

It is preferable to observe the plurality of times that real objects hit the monitor as a method of detecting the plurality of players actually operating the real objects to participate in the game. This method is preferably applied to a throwing game.

It is also possible to photograph the players from the front during the game using a CCD camera and the plurality of players can then be discovered using image analysis. Further, it can also be considered to dispose a plurality of sensors at positions where players are likely to stand and then detect the plurality of players by the sensors.

Another aspect of the present invention provides a method for preventing cheating during a game executed by a game device enabling a plurality of players to participate in a game together. This method includes the following steps;
 receiving a setting for a number of the plurality of players that are to participate in the game;
 executing the game using the set number of the plurality of players received;
 detecting a number of players constituting the plurality of players participating in the game;
 comparing the detected number of the plurality of players and the set number and controlling the difficulty level of the game.

The present invention achieves the same effects as for the first aspect of the invention.

Another aspect of the present invention provides a program for preventing cheating during a game executed by a game device enabling a plurality of players to participate in a game together. The program causes the game device to function as the following units.
 A players-setting unit that receives a setting for a number of the plurality of players that are to participate in the game.
 A game-execution unit that executes the game using the set number of the plurality of players received by the players-setting unit.
 A players-detection unit that detects a number of players constituting the plurality of players participating in the game.
 A difficulty-level-control unit that compares the number of the plurality of players detected by the players-detection unit and the set number of the plurality of players and controls the difficulty level of the game.

The present invention achieves the same effects as the first aspect of the invention.

According to the present invention, it is possible to prevent cheating where a plurality of players participating in a game exceeds a plurality of players set by the game machine.

BRIEF DESCRIPTION OF DRAWINGS

FIG. 5(a) is a view illustrating a positional relationship of an infra-red screen and a monitor, and FIG. 5(b) is a view illustrating an example arrangement for a plurality of infra-red light-emitting devices;

BEST MODE FOR CARRYING OUT THE INVENTION

Figure 1:
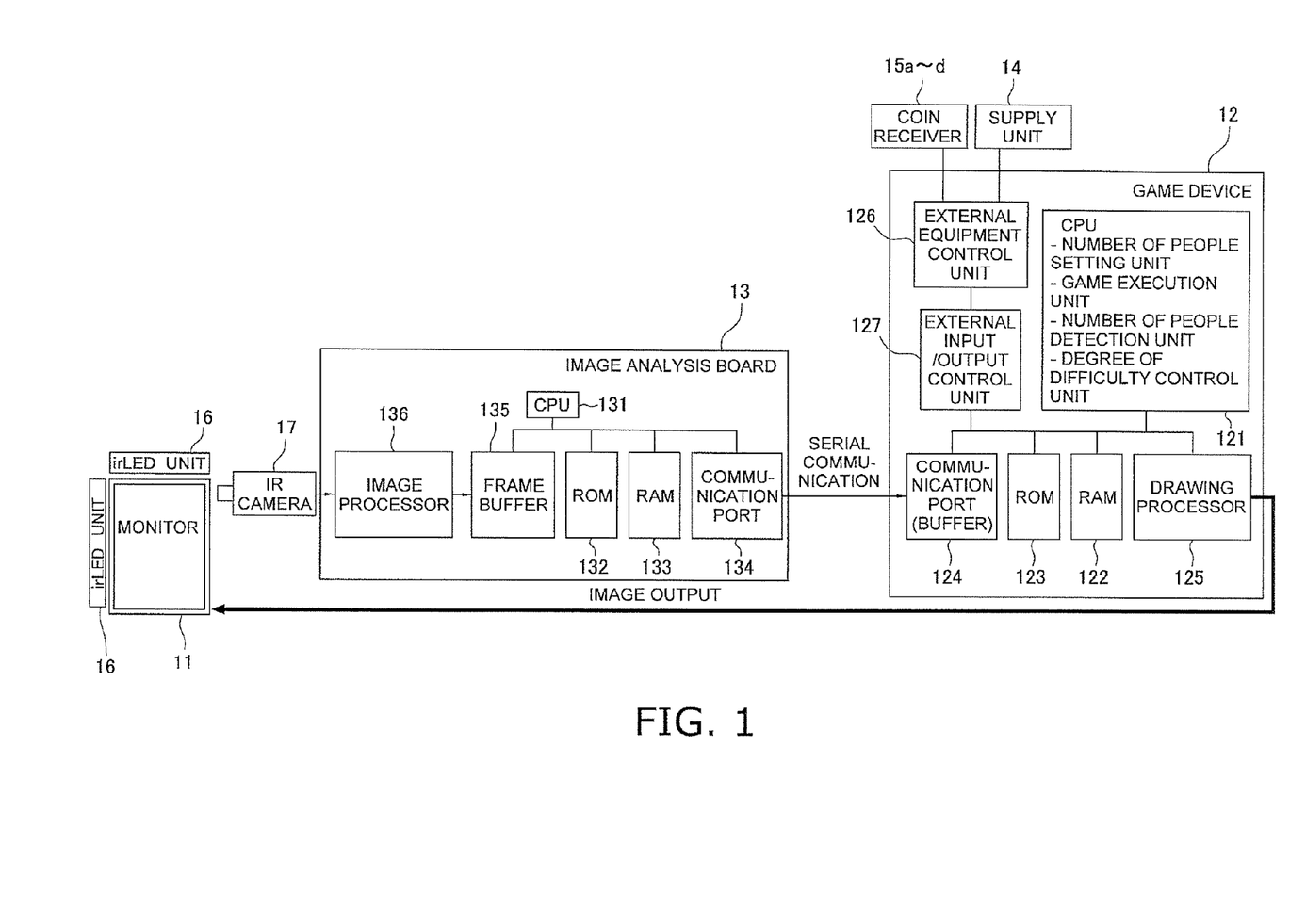
FIG. 1 is a hardware configuration diagram for a game system according to a first embodiment.

First Embodiment (1) Hardware Configuration for Game System (1-1) Hardware Configuration for Game System FIG. 1 shows a hardware configuration for a game system 1. The game system 1 includes a monitor 11, a game device 12, an image analysis board 13, a supply unit 14, a coin receiver 15, an infra-red light-emitting device 16, and an infra-red camera 17. In the drawings, the infra-red camera 17 is denoted by "IR camera 17".

(a) Monitor 11: The monitor 11 displays game objects in game space by outputting images from the game device 12.

(b) Game device 12: The game device 12 executes an arbitrary game and outputs images for the game being executed to the monitor 11. In this embodiment, the game device 12 executes a throwing game that determines whether or not a ball (corresponding to the "real object") thrown by the player hits a game object displayed on the monitor 11 and computes the game results. The game device 12 of this embodiment also decides the plurality of players using how many coins have been put into each of four coin receivers 15a to 15d described later from the coin receiver 15 within a predetermined period. In the following, the decided plurality of players is referred to as the "set plurality of players".

(c) Image analysis board 13: The image analysis board 13 is connected to the infra-red camera 17 and analyzes images taken by the infra-red camera 17. Specifically, the position of reflected light caused by the ball is specified based on the images of the infra-red camera 17.

(d) The supply unit 14: The supply unit 14 supplies balls used by players during the game to the players. The supply unit 14 is not essential but rather is provided as necessary. More specifically, the supply unit 14 is provided when the game device controls the plurality of balls supplied in order to adjust the difficulty level of the game. There are therefore cases where the supply unit 14 can be omitted when the game device adjusts the difficulty level using another method.

(e) The coin receiver 15 receives coins put in by players and sends coin insertion signals to the game device 12. In this example, four coin receivers 15a to 15d are provided. Each coin receiver 15a to 15d sends different coin insertion signals to the game device 12. The coin receiver 15 is also not essential and can be provided as necessary.

(f) Infra-red light-emitting device 16: a plurality of infra-red light-emitting devices 16 are provided directly in front of the monitor 11 and irradiate infra-red light along the monitor 11 so as to span the entire surface of the monitor 11. As a result, a planar infra-red network that is a so-called infra-red screen is generated directly in front of the monitor 11.

(g) Infra-red camera 17: The infra-red camera 17 is set so that at least the whole of the monitor 11 enters within the angular field of view and inputs images taken consecutively or images taken repeatedly at predetermined time intervals $\Delta T1$ to the image analysis board 13. The time interval $\Delta T1$ can be greater than the interval $\Delta T2$ the image of the monitor 11 is updated by ($\Delta T1$ greater than or equal to $\Delta T2$). The infra-red camera 17 includes a camera and an infra-red filter (not shown) fitted to the camera. Infra-red light can then be selectively inputted to the infra-red camera 17. In other words, the infra-red camera 17 selectively photographs light reflected by balls passing through the infra-red screen. Rather than using an infra-red filter, it is also possible to use a camera that detects only infra-red light as the infra-red camera 17. It is also possible to use a CCD camera, a video camera, or a digital camera etc. as the camera constituting the infra-red camera 17. The presence of means for correcting distortion of photographed images is also preferable. For example, it is also possible to use a distortion correction lens such as an aspherical lens and it is possible to correct image distortion using software.

In this embodiment, an example is shown where the supply unit 14 and the coin receiver 15 are connected to the game device as external equipment. However, the external equipment is not limited in this respect. For example, a card reader/writer or a wireless tag reader/writer can also be connected as external equipment.

Further, the structure for hit position determination that determines the positions where the balls hit the monitor 11 is not limited to this embodiment. This is to say that a difference structure can be used in place of the image analysis board 13, the infra-red light-emitting device 16, and the infra-red camera 17. For example, it is also possible to form an infra-red grid to the front of the monitor 11 by arranging a plurality of infra-red light-emitting devices along two edges intersecting with the monitor 11 and obtaining hit positions for the balls in xy coordinates using the infra-red sensor.

(1-2) Hardware Configuration for Game Device

The hardware configuration for the game device 12 is now explained with reference once more to FIG. 1. The game device 12 has the following elements (a) to (e).

(a) CPU 121: The CPU 121 executes a control program stored in a ROM 123 described later. The CPU 121 generates a supply-amount-control command, sends the supply-amount-control command to the supply unit 14, and decides the set plurality of players based on the coin insertion signal from the coin receiver 15.

(b) RAM 122: The RAM 122 temporarily stores various variables and parameters etc.

(c) ROM 123: The ROM 123 stores the control program and various parameters etc.

(d) Communication port 124: The communication port 124 receives data from the image analysis board 13 via a communication cable such as, for example, an RS232 communication cable and stores the received data in an internal buffer.

(e) Drawing processor 125: The drawing processor 125 generates image data displayed at the monitor 11.

(f) External equipment control unit 126: The external equipment control unit 126 controls external equipment such as the supply unit 14 and the coin receiver 15.

(g) External input/output control unit 127: The external input/output control unit 127 generates control commands for the external equipment. In this example, supply-amount-control commands are generated for the supply unit 14 and are sent to the external equipment control unit 126. Further, signals from the external equipment are received and sent to the CPU 121. In this example, the coin insertion signal is received from the coin receiver 15 and is sent to the CPU 121.

Further, in addition to the elements described above, the game device 12 can be connected to a speaker, a sound reproduction unit, or an input operation unit etc. (not shown). The speaker outputs sounds during execution of games and while displaying a demonstration screen. The sound reproduction unit generates sound data for output to the speaker. The input operation unit is constructed from a joystick and operation button etc. and receives instructions inputted by players.

The game device 12 constructed in this manner executes throwing games in accordance with the control program stored in the ROM 123.

(1-3) Hardware Configuration for Image Analysis Board

The hardware configuration for the image analysis board 13 is now explained with reference once more to FIG. 1.

The image analysis board 13 has a CPU 131, a ROM 132, a RAM 133, a communication port 134, a frame buffer 135, and an image processor 136.

The image processor 136 puts images inputted from the infra-red camera 17 into the form of digital data that is then expanded at the frame buffer 135. More specifically, the image processor 136 performs 1) A/D conversion of inputted images, 2) generation of addresses and writing of data in the form of digital data to memory space for storage in the frame buffer 135, 3) notifying the CPU 131 of the completion of the process 1) and the process 2) for one frame portion. Images taken by the infra-red camera 17 are expanded at the frame buffer 135. The CPU 131 reads out an image processing program stored in the ROM 132 and specifies the position of light reflected by the balls based on images written to the frame buffer 135 while using the RAM 133 as a work space. The details of the image analysis processing carried out by the CPU 131 are described in detail in the following. The CPU 131 writes specified position information to a buffer 124 of the game device 12 via the communication port 134.

In this embodiment, it is possible to accurately detect both the positions at which the balls hit the monitor and the plurality of balls using the image analysis board 13. However, it is also possible to respectively specify the hitting position of each ball and the plurality of balls hitting even when a plurality of balls hit the monitor at the same time. This processing is described in detail in the following (refer to "hit position determination processing" (4-2)).

(2) Example of Game System (2-1) External Appearance of Game System

Figure 2:
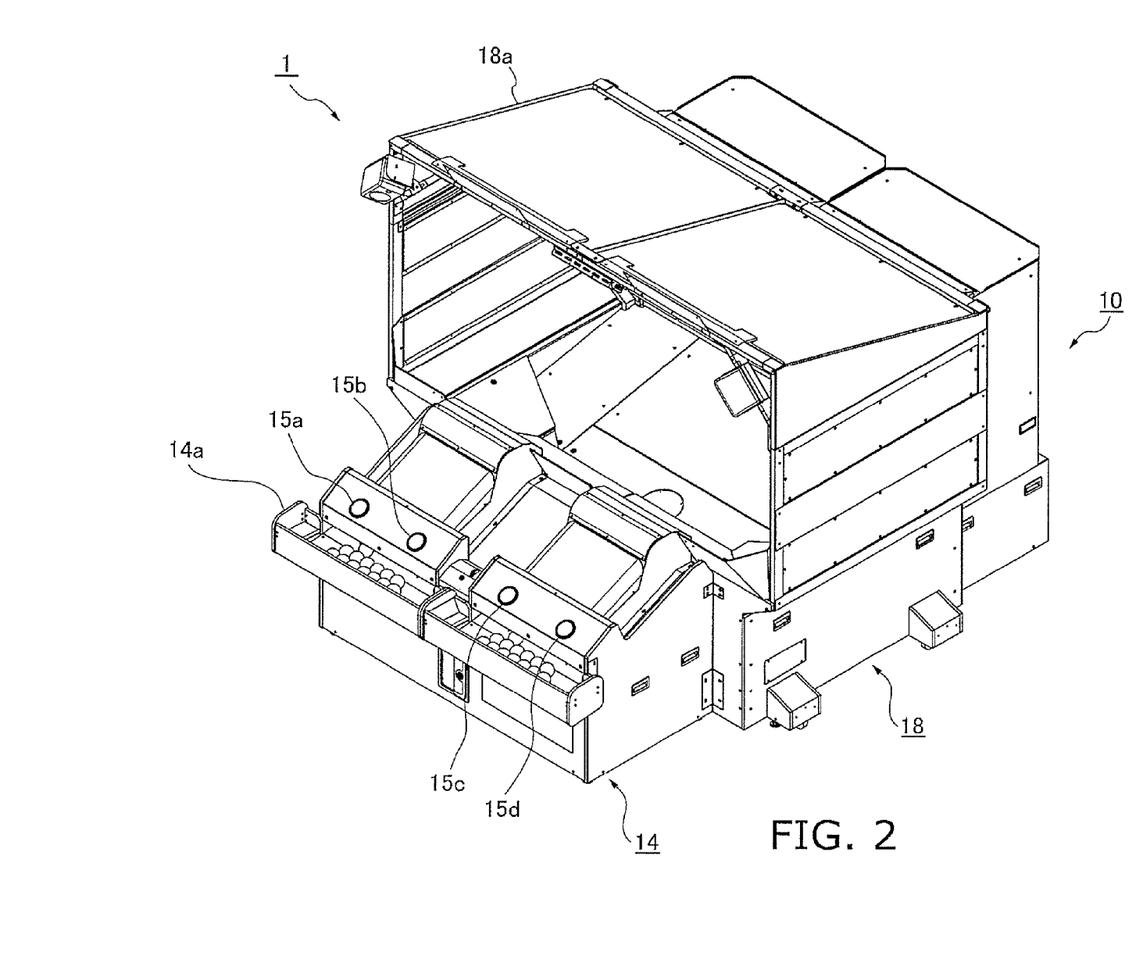
FIG. 2 is an exterior perspective view showing an example of the game system shown in FIG. 1.
Figure 3:
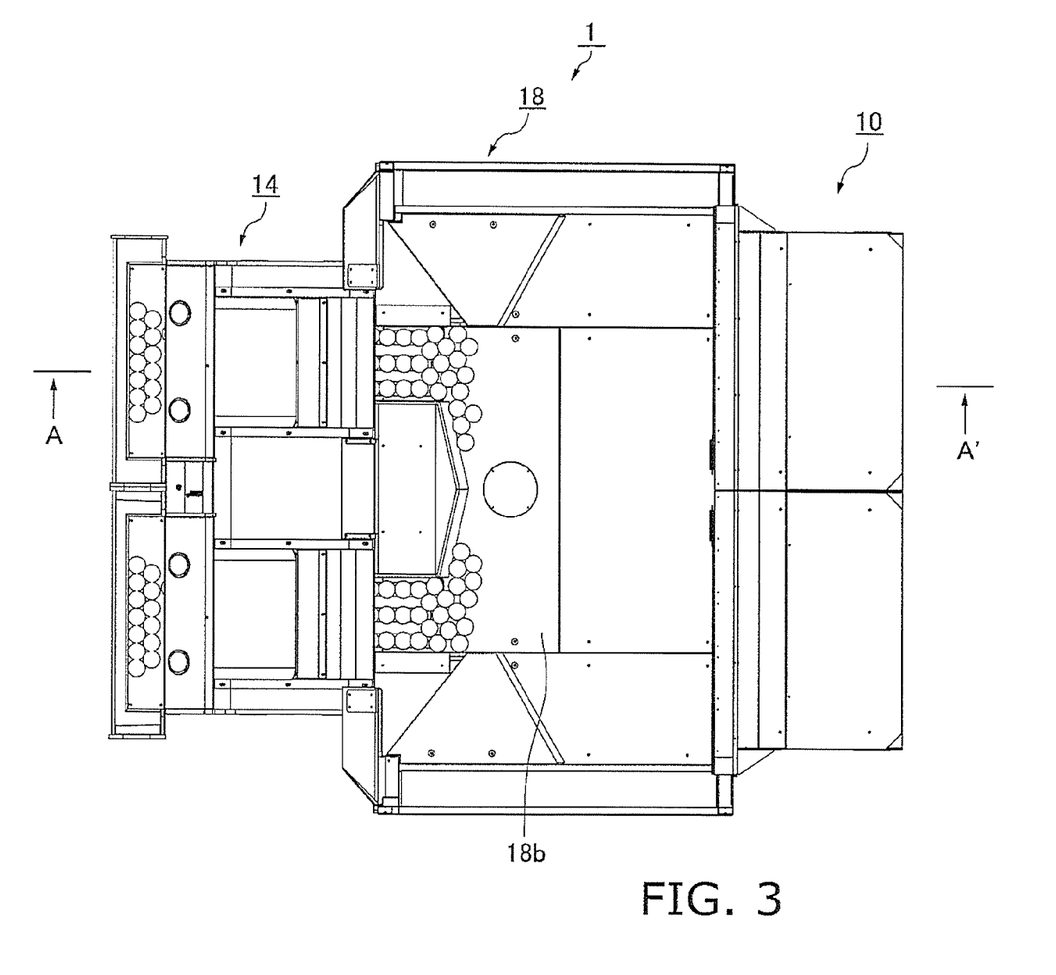
FIG. 3 is a plan view of the game system shown in FIG. 2.
Figure 4:
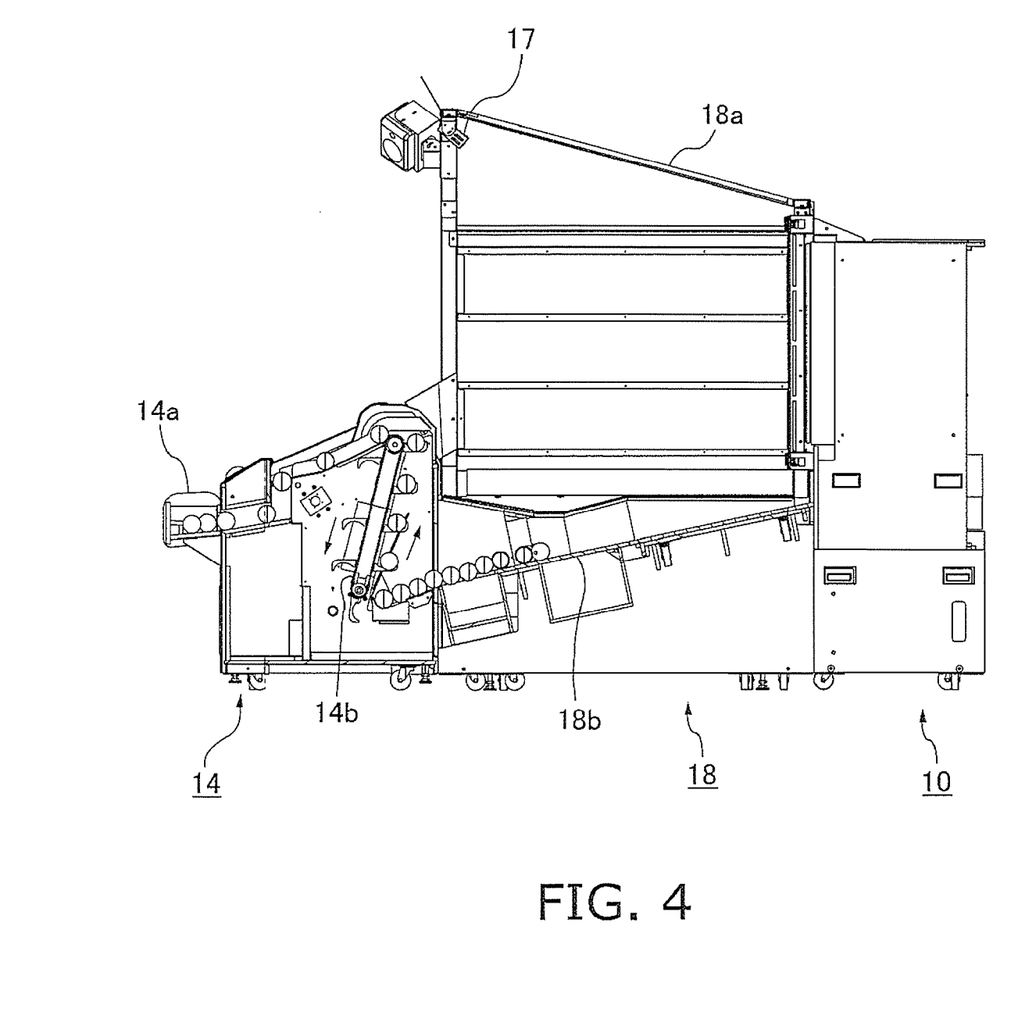
FIG. 4 is a cross-sectional view along direction A-A' of FIG. 3 of the game system shown in FIG. 2.

FIG. 2 is an exterior perspective view showing an example of the game system 1. FIG. 3 is a plan view of the game system 1 shown in FIG. 2. FIG. 4 is a cross-sectional view in the direction A-A' of FIG. 3.

The game system 1 includes a game unit 10, the supply unit 14, and a collection unit 18.

The game unit 10 includes the monitor 11 and the game device 12 (not shown). The monitor 11 is disposed facing the player(s) who are standing up to the front of the supply unit 14. The game device 12 is built-into the game unit 10.

The supply unit 14 includes a supply unit 14a and a lift 14b. The supply unit 14a supplies balls to the players. An upper part of the supply unit 14a is open so as to make it easy for players to take balls out. There is no limit on the plurality of players extracting balls from the supply unit 14a. The lift 14b successively supplies balls collected by the collection unit 18 to the supply unit 14a. Further, in this example, the four coin receivers 15a to 15d are incorporated in the supply unit 14.

The collection unit 18 includes a cover 18a and a slope 18b. The cover 18a covers the top and both sides of a space between the game unit 10 and the supply unit 14 and collects balls hitting the monitor 11 on the slope 18b. The slope 18b is inclined so as to become higher closer to the monitor 11. Balls thrown towards the monitor 11 are then collected at the side of the supply unit 14.

The infra-red camera 17 is fitted to the cover 18a of the collection unit 18. In this example, the infra-red camera 17 is disposed at a central upper part of the opening of the cover 18a so that the entire surface of the monitor 11 is in the field angle of the infra-red camera 17.

Players standing in front of the supply unit 14 then play the game by throwing balls supplied by the supply unit 14a towards the monitor 11 at this game system 1.

(2-2) Example of Position Detection

Figure 5:
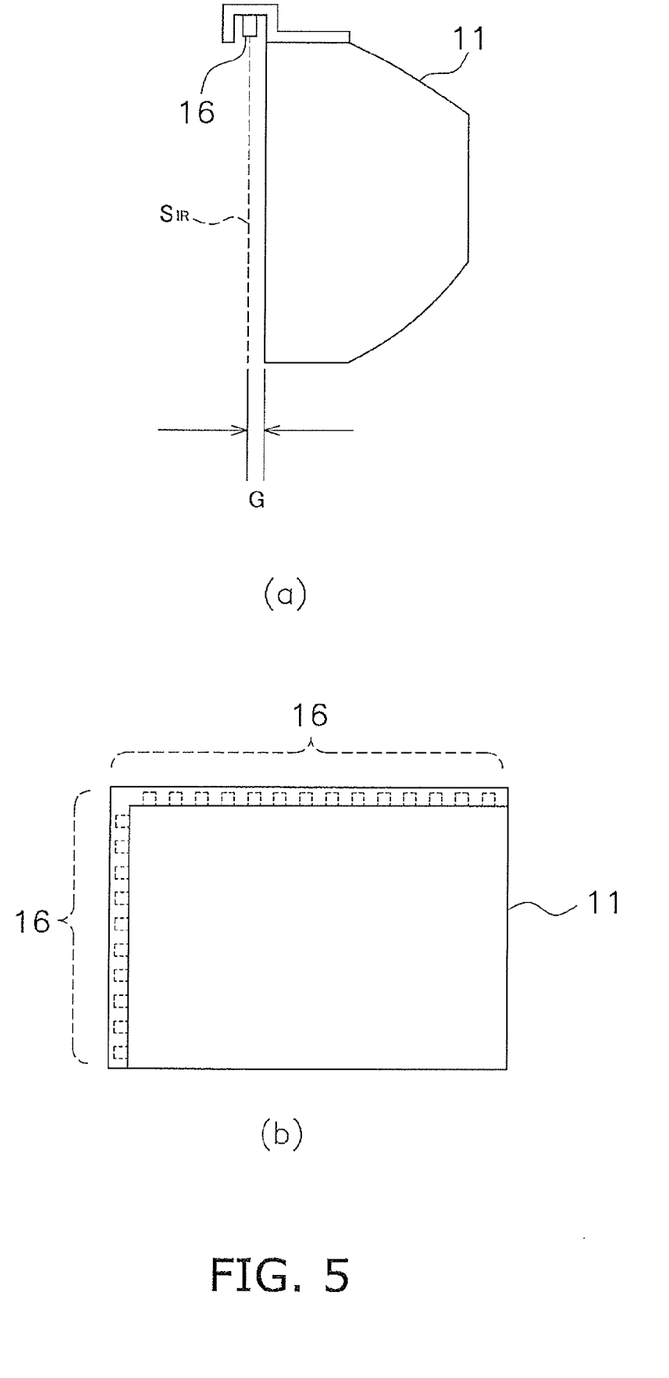
FIG. 5 is a view illustrating a position detection method, where

FIG. 5(*a*) is an explanatory view showing a positional relationship of an infra-red screen $S_{IR}$ formed by the infra-red light-emitting device 16 and the monitor 11. The infra-red screen $S_{IR}$ is positioned between the display surface of the monitor 11 and the infra-red camera 17. In other words, the monitor 11 is disposed on the opposite side to the infra-red camera 17 so as to sandwich the infra-red screen $S_{IR}$.

It is preferable for the infra-red screen $S_{IR}$ and the display surface of the monitor 11 to be positioned close to each other. It is then possible to specify in practical terms where on the monitor display surface has been hit by an object by disposing the infra-red screen $S_{IR}$ and the display surface of the monitor 11 in close proximity. It is then possible for the balls to be made to reflect infra-red light directly in front of the monitor by forming the infra-red screen $S_{IR}$ directly in front of the display surface of the monitor 11. Deviation between a position where a ball hits the monitor 11 and a position of reflection can be made smaller the closer together the infra-red screen $S_{IR}$ and the display surface of the monitor 11 are.

It is also preferable for a distance G between the infra-red screen $S_{IR}$ and the display surface of the monitor 11 to be adjusted not to exceed a maximum length of a ball, i.e. a ball's diameter. By adjusting the distance between both parties in advance, it is possible to prevent re-reflection of infra-red light by balls that hit the display surface of the monitor 11 and rebound.

It is preferable for the infra-red screen $S_{IR}$ to be of a size greater than or equal to the display surface of the monitor 11, i.e. of a size that is the same as or greater than the display surface of the monitor 11 so as to cover the display surface. This is because the surface of the infra-red screen $S_{IR}$ decides a region where it is possible to detect the position of balls. Conversely, it is also possible for the infra-red screen $S_{IR}$ to be smaller than the display surface of the monitor 11.

FIG. 5(*b*) shows an example arrangement for a plurality of infra-red light-emitting devices 16. A plurality of infra-red light-emitting devices 16 are disposed at regular intervals along a peripheral edge of a rectangular plane along the display surface of the monitor.

The plurality of infra-red light-emitting devices 16 irradiate infra-red light having directivity in a direction along the display surface of the monitor. An optical axis of infra-red light irradiated from the infra-red light-emitting devices 16 is positioned on a rectangular plane and the direction of irradiation of the infra-red light is contained in this rectangular plane. The infra-red light coming from the infra-red light-emitting devices 16 has directivity. The thickness of the infra-red screen is therefore thin. This is connected to deviation between a reflection position generated as a result of a ball passing through the infra-red screen and a position where the ball actually hits the monitor. It is therefore possible to increase the accuracy of detecting the position of the ball. It is therefore possible to make deviation between the timing of a ball colliding with the infra-red screen and the timing of the emission of reflected light small because it is possible to make emission time for the reflected light short.

The plurality of infra-red light-emitting devices 16 are preferably arranged along at least two edges. Arrangement along two opposing edges is possible, as is arrangement along two intersecting edges.

With the above structure, the plurality of infra-red light-emitting devices 16 form a rectangular infra-red screen. Balls passing through this infra-red screen are then irradiated substantially equally with infra-red light from at least two directions. As it is therefore difficult for a certain ball to be in the shadow of another ball, it is possible to irradiate all of the plurality of balls with infra-red light in an equal and uniform manner even when a plurality of balls pass through the screen at the same time.

The intervals for the infra-red light-emitting devices 16 do not have to be equally spaced but if this is the case, it is possible to make the intensity of the infra-red light uniform at the infra-red screen. Arrangement of the infra-red light-emitting device 16 is not limited to this example providing that an infra-red screen can be formed effectively.

(2-3) Example of a Game

Figure 6:
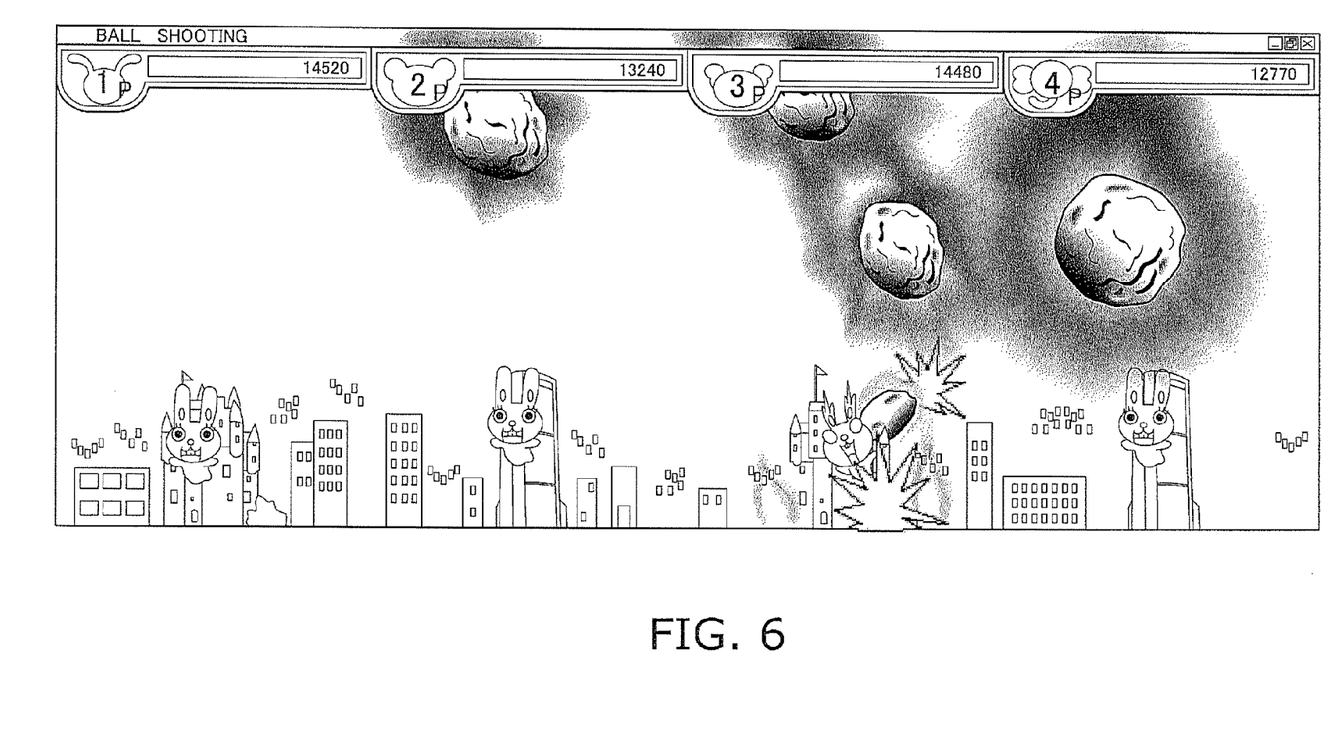
FIG. 6 is an example screen showing an example of a game executed by a game device.

FIG. 6 is an example screen showing an example of a game executed by the game device 12. Game results for this game can be computed from balls hitting a moving target. The targets that are displayed are meteorites (corresponding to the game object) that move from the top of the screen to the bottom of the screen. The players then throw balls at the meteorites before the meteorites reach a building that a rabbit lives in displayed at the bottom of the screen so that the balls hit the meteorites. The plurality of remaining lives for the rabbit is then displayed numerically at a position corresponding to each rabbit at the upper part of the screen. The game is over when the plurality of lives for the rabbit becomes zero, or when the rabbit is hit by a meteorite.

The game device 12 decides the set plurality of players according to the plurality of coins put into the coin receiver 15 and executes the game according to the plurality of players set. In this example, a program is set in such a manner that one player rescues one rabbit. The set plurality of players and the same plurality of rabbits are therefore displayed on the screen. When all of the coins are put into the four coin receivers 15, four rabbits are displayed as shown in FIG. 6.

The game device 12 then determines whether or not the balls hit the meteorites based on the positions of the balls specified by the image analysis board 13 and the display positions for the meteorites. If the result of a hit determination is that a ball has hit a meteorite, it is displayed that the meteorite has been pulverized.

The game device 12 detects the plurality of players that are actually playing the game, i.e. the plurality of players. Further, the game device 12 compares the detected plurality of players and the set plurality of players. It is then possible to control the plurality of balls provided per unit time to the supply unit 14a based on the comparison results. Specifically, when the plurality of players exceeds the set plurality of players, the speed of the lift slows down and the plurality of balls supplied per unit time is reduced. As a result, it is possible to increase the difficulty level of the game when a cheating is detected, the game ends quickly, and the period for which cheating takes place is made shorter.

(3) Software Configuration for Game Device

The function of the CPU 121 of the game device 12 is now explained with reference once more to FIG. 1. The CPU 121 of the game device 12 functions as a players-setting unit, a game-execution unit, a players-detection unit, and a difficulty-level-control unit as a result of executing the program stored in the ROM 123. The function of each part is explained in detail in the following. For ease of description, an explanation is given taking an example of a throwing game.

(3-1) Players-setting Unit

The players-setting unit receives the plurality of players that are to participate in the game, i.e. receives a set number of players to be set. In this embodiment, the players-setting unit decides the set plurality of players using the plurality of coins that are put into the coin receiver 15. In addition to this, the players-setting unit can also decide the plurality of players set from the plurality of coins that are put in or from explicit instructions given to the players for the plurality of players set.

(3-2) Game-execution Unit

The game-execution unit executes the game using the set number of players received by the players-setting unit. Specifically, the game is executed by changing the plurality of targets to be hit by a ball, the speed of the targets, and the size of the targets etc. according to the plurality of players set.

Further, the game-execution unit determines hits based on display positions on the monitor of targets within the game space during execution of the game and positions where the balls hit the monitor. Position information for where the balls hit the monitor is acquired from the image analysis board 13.

(3-3) Players-detection Unit

The players-detection unit detects the plurality of players constituting the plurality of players participating in the game. In this embodiment, the players-detection unit decides the plurality of players based on the plurality of hits per unit time for the balls hitting the monitor and a reference plurality of hits per unit time.

In this embodiment, the players-detection unit computes the plurality of balls hitting per predetermined time interval $\Delta T2$ (corresponding to the unit time: $\Delta T2 > \Delta T1$) based on the plurality of balls hitting the monitor during a predetermined time interval $\Delta T1$. A plurality of players determination table is then referred to and a plurality of players playing corresponding to the computed plurality of balls hitting is read out.

First, the players-detection unit acquires position information for balls hitting the monitor from the image analysis board every predetermined time interval $\Delta T1$. The plurality of balls hitting the monitor in the predetermined time interval $\Delta T1$ is then counted based on the acquired position information. For example, when xy coordinates indicating a position on the monitor are acquired as position information, the players-detection unit calculates the plurality of points indicated by the xy coordinates. Further, the players-detection unit obtains the total for the plurality of balls hitting in the time interval $\Delta T1$, and obtains the plurality of balls hitting in the predetermined time interval $\Delta T2$, for example, the plurality of balls hitting per one minute. As a result of this processing, the players-detection unit writes the total value for the plurality of balls temporarily to the RAM 122, and sequentially adds newly calculated ball numbers to the total value. The total value for the plurality of balls written to the RAM 122 is then cleared every time the predetermined time interval $\Delta T2$ elapses.

Figure 7:
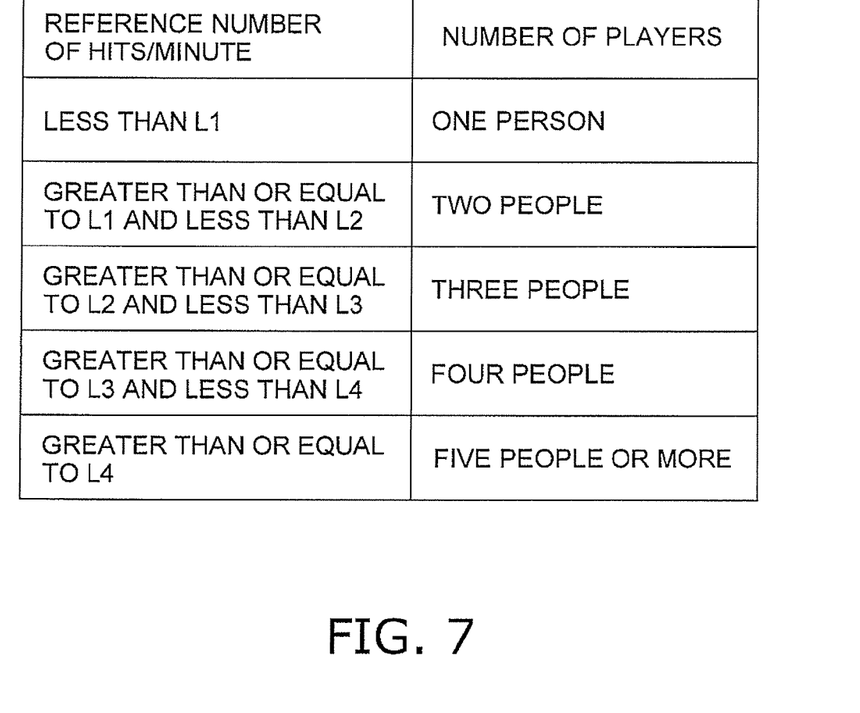
FIG. 7 is a view illustrating the concept of a plurality of players determination table.

FIG. 7 is a view illustrating the concept for the plurality of players determination table stored in the ROM 123. In this example, the predetermined time interval $\Delta T2$ is one minute. The reference plurality of hits per one minute and the plurality of players are correlated in this table. The players-detection unit then reads out the plurality of players corresponding to the computed plurality of balls hitting per one minute from the plurality of players determination table and decides the plurality of players.

(3-4) Difficulty-level-control Unit

The difficulty-level-control unit compares the plurality of players detected by the players-detection unit and the set plurality of players and controls the difficulty level of the game. In this embodiment, the difficulty-level-control unit sends a supply-amount-control command that controls the plurality of balls supplied to the supply unit 14 in accordance with the comparison results. For example, the difficulty-level-control unit decides the speed of the lift 14*b* within the supply unit 14 according to the comparison results and a speed table described later and transmits a supply-amount-control command designating the speed of the lift 14*b*.

Figure 8:
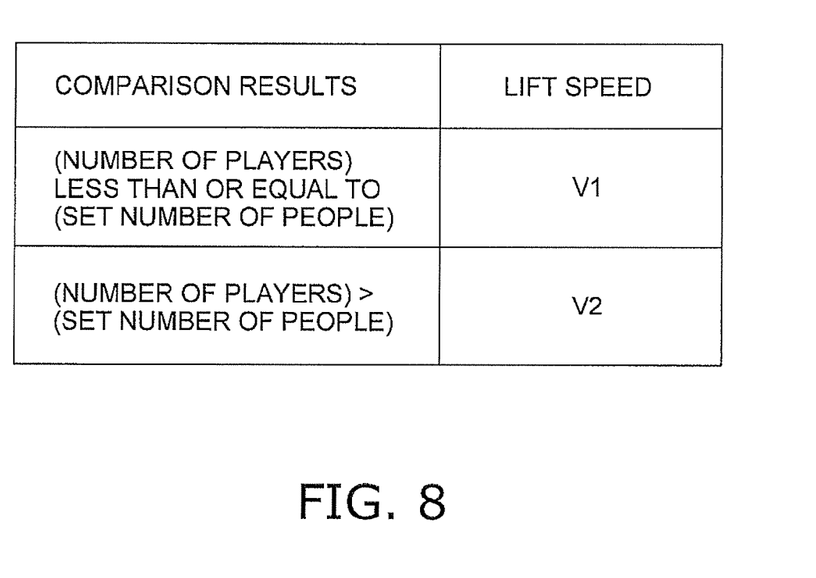
FIG. 8 is a view illustrating the concept of a speed table.

FIG. 8 is a view illustrating the concept of a speed table correlating the comparison results and the speed of the lift. The speed table is stored in the ROM 123 of the game device 12. The difficulty-level-control unit designates the speed of the lift as "V1" when the detected plurality of players is the set plurality of players or less based on this table. On the other hand, when the detected plurality of players exceeds the set plurality of players, the difficulty-level-control unit designates the speed of the lift to be "V2" (where V2<V1). As a result, when the plurality of players exceeds the set plurality of players, the speed of the lift is made slow compared to the converse case, and plurality of balls supplied per unit time is reduced. As a result, in order to increase the difficulty level for the player, the time the game can be resumed for using the initial fee that is put in is made short and the time that the cheating can take place for is shortened.

(4) Processing
(4-1) Main Routine

Figure 9:
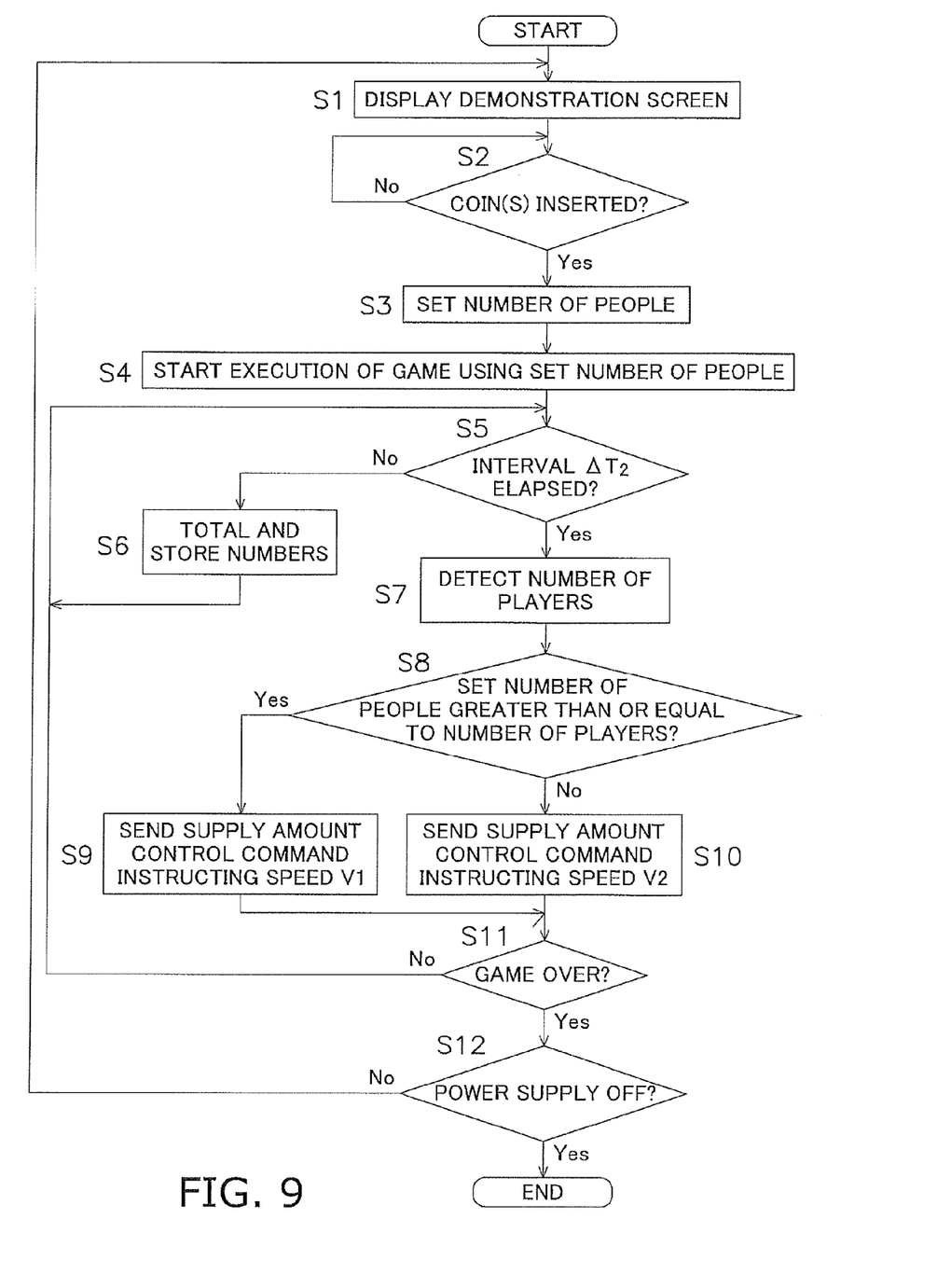
FIG. 9 is a flowchart showing an example of a flow for game processing carried out by the game device.

FIG. 9 is a flowchart showing an example of a flow for game processing carried out by the game device 12. When a power supply is turned on, the CPU 121 of the game device 12 starts the following processing.

Step S1 to S2: The CPU 121 waits for coins to be put in while outputting a demonstration screen at the monitor 11 (S1). After coins are put into any of the coin receivers 15 and a predetermined time elapses (S2), step S3 is proceeded to.

Step S3: the CPU 121 determines the plurality of coin receivers 15 that have received coins and takes this number to be the set plurality of players.

Step S4: the CPU 121 executes a game program stored in the ROM 123 according to the set plurality of players. As a result of this execution, the CPU 121 refers to the buffer within the communication port 124 for the required timing. Position information for the balls written to the buffer within the communication port 124 at the referred time is then utilized in hit determination. For example, the CPU 121 refers to the buffer within the communication port 124 every ΔT1. The game program is then executed in parallel independently from this main routine.

Step S5 and S6: The CPU 121 reads out the plurality of balls at the same time as referring to the buffer within the communication port 124. The total value is then computed and temporarily written to the RAM 122 etc. The CPU 121 then repeats this process, for example, every time ΔT1, until a predetermined duration ΔT2 (where ΔT2>ΔT1) elapses. As a result, the total plurality of balls hitting the monitor 11 during the predetermined period ΔT2 at the time where the predetermined duration ΔT2 elapses is written to the RAM 122.

Step S7: After this, the CPU 121 decides the plurality of players based on the total plurality of balls written to the RAM 122 and the plurality of players determination table. The CPU 121 then resets the total plurality of balls written to the RAM 122.

Step S8: The CPU 121 then compares the plurality of players and the set plurality of players. If the plurality of players is the set plurality of players or less, step S9 is proceeded to ((plurality of players) less than or equal to (set plurality of players)). In other cases, step S10 is proceeded to.

Step S9: The CPU 121 then refers to the speed table, reads out the speed V1 of the lift according to the comparison results, and sends a supply-amount-control command indicating the read-out speed V1 to the supply unit 14. In this example, when the plurality of players is the set plurality of players or less, the speed of the lift is V1, regardless of the set plurality of players. The supply unit 14 then adjusts the speed of the lift so that the lift moves at a speed V1 designated by the supply-amount-control command. As a result, when the plurality of players is the set plurality of players or less, an amount of balls that is sufficient for all of the players is supplied to the supply unit.

Step S10: The CPU 121 then refers to the speed table, reads out the speed V2 (V2<V1) of the lift according to the comparison results, and sends a supply-amount-control command indicating the read-out speed V2 to the supply unit 14. The supply unit 14 then reduces the speed of the lift so that the lift moves at the speed V2 designated by the supply-amount-control command. As a result, the plurality of balls per unit time supplied to the supply unit is small compared to step S9 when the plurality of players exceeds the set plurality of players.

Step S11: The CPU 121 repeats the processing of steps S5 to S10 until the game executed by the game-execution unit ends.

Step S12: After the game ends and providing that the power supply of the game device 12 is not turned off, the CPU 121 displays the demonstration screen (S1) and waits for coins to be put in.

From the above processing, when a plurality of players exceeding the set plurality of players is detected during the game, the movement of the lift becomes slower, and the plurality of balls supplied per unit time is reduced. This has the effect of increasing the difficulty level of the game for the player when the plurality of players participating in the game exceeds the set plurality of players. On the other hand, when the plurality of players is less than or equal to the set plurality of players, the lift is operated at a speed giving a sufficient supply of balls per unit time. This means that all of the players are supplied with a sufficient plurality of balls. Namely, in the event of cheating, progression through the game becomes difficult. This prevents cheating from being continued for a long period of time.

Further, the plurality of players is detected every predetermined duration ΔT2 and the speed of the lift is adjusted according to the detection results. It is therefore possible to adjust the speed of the lift in line with dynamic changes in the plurality of players. This means that a penalty is imposed where the lift is slowed down and the difficulty level is raised only when cheating occurs.

Figure 10:
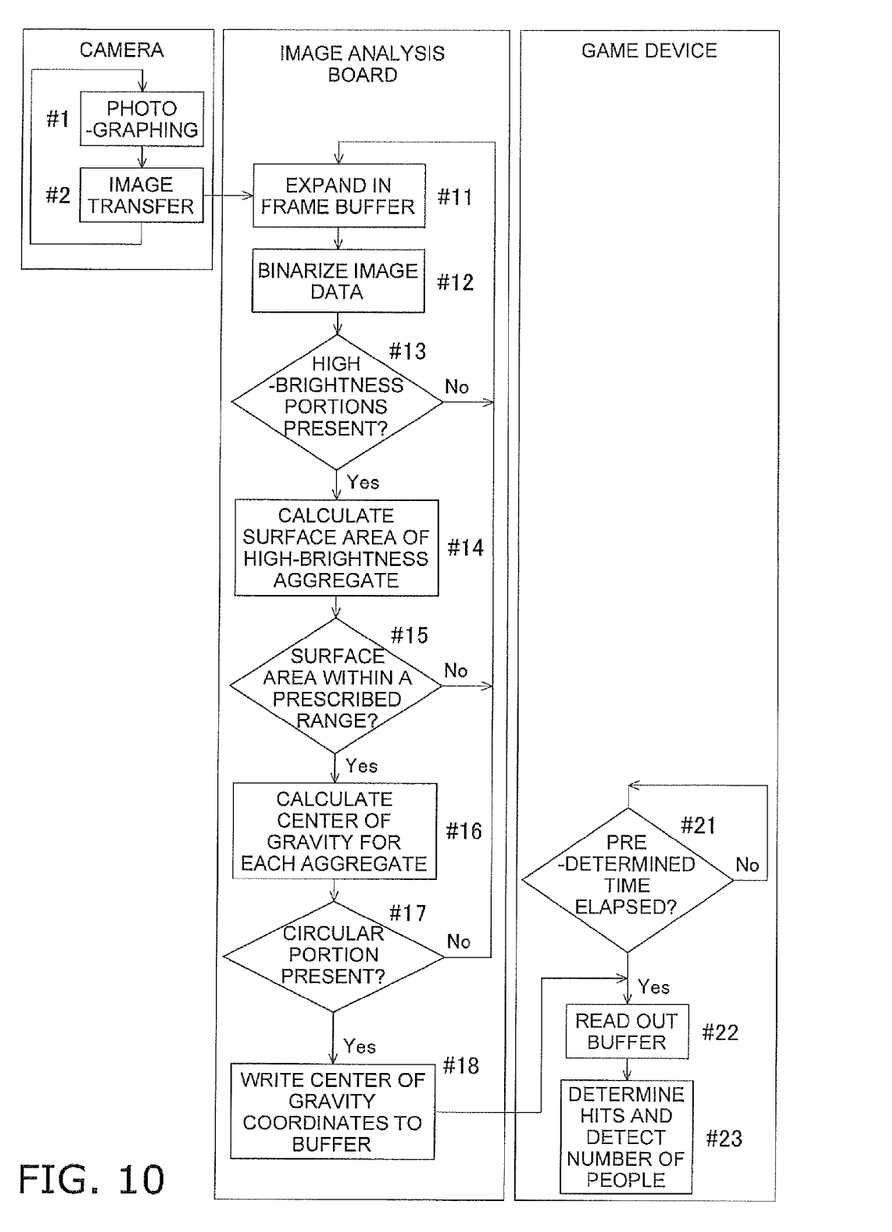
FIG. 10 is a view illustrating an example of a flow for hit position determination processing carried out by the game system.

(4-2) Hit Position Determination Processing FIG. 10 is a view illustrating an example of a flow for hit position determination processing carried out by the game system 1. In this drawing, an example of the flow of image analysis processing executed by the image analysis board 13 is shown.

Processing for Infra-red Camera

The infra-red camera 17 takes consecutive images (#1) and transfers an image signal to the image analysis board 13 (#2).

Processing for Image Analysis Board

The image processor 136 receives image signals from the infra-red camera 17, puts the image signals into the form of digital data, and expands the digital data at the frame buffer 135 (#11).

The CPU 131 puts the image data expanded at the frame buffer 135 into dot units and binarizes the image data taking a predetermined threshold value as a reference (#12). The CPU 131 then selects portions where the brightness of infra-red light is high using dot units (#13). The CPU 131 then calculates the surface area of aggregates for selected portions where the brightness is high, i.e. aggregates constituted by one or more high-brightness dots (#14). The CPU 131 then determines whether or not each of the calculated surface areas are the size of a predetermined range (#15). If an aggregate of high-brightness dots having a predetermined size is present, a center of gravity coordinate is obtained for each high-brightness aggregate (#16). Next, the CPU 131 determines whether or not a degree of circularity of the aggregate the center of gravity coordinate is obtained for is within a predetermined range (#17). For example, if a percentage of dots of a high degree of brightness exist within a predetermined range inside a circle of a predetermined radius taking the obtained center of gravity coordinate as center, this aggregate can be determined to be circular.

Next, the CPU 131 takes the highly bright aggregate determined to be circular to be an image of a ball. The CPU 131 then writes the center of gravity coordinates for the ball in the frame buffer 135 to a buffer within the communication port 124 of the game device 12 (#18).

Processing for Game Device

The CPU 121 of the game device 12 refers to the buffer within the communication port 124 every time the predetermined time $\Delta T1$ elapses and reads out the newest position information and plurality of items (#21, #22). The read-out information can then be used in determining the hits in the game (#23). The game device 12 then determines hits during the game using the position information written to the buffer in the communication port 124 by carrying out processing every predetermined time interval $\Delta T1$ of, for example, $\frac{1}{60}$ seconds.

The read-out information can be used to detect the plurality of players actually participating in the game. The game device 12 reads out the plurality of items for example, every $\frac{1}{60}$ seconds. The plurality of balls hitting the monitor 11 in a predetermined time interval $\Delta T2$ ($\Delta T2 > \Delta T1$) is then detected by totaling the plurality of items read out. The plurality of players is then detected based on the detected plurality of balls that hit.

Determination of the hitting positions is not limited to the method described above but if this method is employed, it is possible to reliably detect both the position at which balls hit the monitor and the plurality of balls hitting using a common hardware configuration. However, it is also possible to respectively specify the hitting position of each ball and the plurality of balls hitting even when a plurality of balls hit the monitor at the same time.

According to this method, light reflected by the balls occurs directly in front of the monitor. This means that deviation between the positions where light is reflected and the positions where the balls hit the monitor does not present a problem. Deviation between the timing where reflected light occurs and the timing where a ball hits a monitor is therefore not a significant problem. This means that a player is not subjected to an unpleasant feeling due to time deviation or positional deviation even when determining hitting of virtual objects in the game space based on detection results.

(5) Effects

According to the present invention, the difficulty level is controlled according to the results of comparing the plurality of players and the set plurality of players. It is therefore possible for a plurality of cheating players to continue the game but the time per unit price will become shorter. For example, when a larger plurality of players than the set plurality of players is detected, the difficulty level is made to increase. As a result, the game time is shortened and the time that players playing the game unfairly can indulge in cheating for can be made shorter.

The present invention is therefore capable of shortening the game time for cheating players in games where it is difficult to limit the plurality of players operating real objects even for games where a plurality of players can participate together.

Other Embodiments (A) Other methods can be considered in addition to that described above as methods for controlling the difficulty level. Examples of these methods are given below. It is also possible to control the difficulty level using appropriate combinations of the examples described above and the examples described below.

Quota

It is also possible to control the difficulty level by changing the quota according to the results of comparing the plurality of players and the set plurality of players. In this event, the difficulty-level-control unit outputs a quota change command including the results of comparing the plurality of players and the set plurality of players or instructing a quota for after changing to the game-execution unit. The game-execution unit then executes the game based on a default quota designated when the game starts. When the quota change command is received from the difficulty-level-control unit, the game is executed using a quota corresponding to the comparison results or using a designated quota.

For example, if the game is a throwing game, the plurality of targets to be hit by real objects such as balls within the predetermined time is increased. As a result, it becomes difficult for cheating players to continue the game for the same fee and the time for cheating is shortened.

Conditions for clearing each game stage can be given as a further example of setting a quota when a plurality of game stages are set within one game. For example, control of the difficulty level by changing the quota can be applied to sports games and sword games, throwing games and "whack a mole" games.

Handicap

It is also possible to control the difficulty level by changing the handicap according to the results of comparing the plurality of players and the set plurality of players. In this event, the difficulty-level-control unit outputs a command including the comparison results or an instruction for the handicap for after changing to the game-execution unit. The game-execution unit then executes the game based on a default handicap designated when the game starts and changes the handicap setting according to commands from the difficulty-level-control unit.

For example, if an example of the first embodiment is used, the initial value for the plurality of lives for the rabbit given to the player may be reduced or the targets may be made smaller.

Speed of Targets

It is also possible to control the difficulty level by changing the speed of the targets according to the results of comparing the plurality of players and the set plurality of players. In this event, the difficulty-level-control unit outputs a speed-change-command including the comparison results or an instruction for the target speed for after changing to the game-execution unit. The game-execution unit moves the target at the set default speed when the game starts and changes the speed the target moves on the monitor according to the speed-change-command.

For example, when a plurality of players greater than the set plurality of players is detected, the speed the targets move at is increased. As a result, it becomes difficult for cheating players to hit a game object with an real object and the difficulty level is increased. As a result, the game continuation time per unit price is shortened. For example, this game device can be applied to sports games and sword games, throwing games and "whack a mole" games.

Accuracy of Hit Determination

It is also possible to control the difficulty level by changing the accuracy of the hit determination according to the results of comparing the plurality of players and the set plurality of players. In this event, the difficulty-level-control unit outputs an accuracy-change command including the comparison results or an instruction for the accuracy of the hit determination for after changing to the game-execution unit. The game-execution unit then carries out hit determinations using the accuracy set when the game starts and changes the precision of the hit determination according to the accuracy-change command.

For example, when a plurality of players greater than the set plurality of players is detected, the accuracy of the hit determination is increased. As a result, it becomes difficult for cheating players to hit a target with a ball and the difficulty level is increased. As a result, the time the game continues for putting in the initial fee is made shorter. For example, this game device can be applied to sports games and sword games, throwing games and "whack a mole" games.

Adjusting the Difficulty Level When the Target is in Real Space

It is also possible to adjust the difficulty level in games where the target exists in real space. For example, with a "whack a mole on the head" game, the difficulty level can be increased by may making the time the mole that is the target pops up for shorter, making an appearance interval shorter, or increasing the plurality of targets that appear at the same time.

(B) The method for detecting the plurality of players is not limited to the above and any detection method applicable to a game can be adopted. For example, in sports games using a bat or club, or a tennis racket, etc., or a combat game etc., there are cases where it is preferable to detect the plurality of players using a different method. In this event, during the game the players are photographed from the front by, for example, a CCD camera and the plurality of players can then be found out by image analysis. Further, it can also be considered to dispose a plurality of sensors at positions where players are likely to stand and then detect the plurality of players using the sensors.

(C) In the example described above, the plurality of players and the set plurality of players are compared every time the predetermined duration $\Delta T2$ elapses and the difficulty level is adjusted based on the results of the comparison periodically. However, when the plurality of players is detected to have exceeded the set plurality of players once, after this, it is preferable for the difficulty level not to return to the original value but rather to stay raised even if the plurality of players falls to equal to or below the set plurality of players. According to an example given for the first embodiment, the speed of the lift should remain slow. This is to impose a more severe penalty on players that partake in cheating and to prevent the reoccurrence of cheating from being easy.

(D) The method of the present invention is also applicable to other games. In addition to throwing games, bowling games etc can be given as games where real objects such as balls used by a player are repeatedly used by the players while being circulated. Sports games using bats, rackets, and golf clubs, and combat games can also be given as games that do not determine hits on a monitor. Music games etc. can be given as games where hits are not determined.

(E) In the first embodiment, the difficulty level is increased when the plurality of players exceeds the set plurality of players and it is therefore possible to shorten the game time for cheating. Conversely, it is also preferable to lower the difficulty level. It is also possible to obtain the same effect by deadening the motivation of the players participating in the game by lowering the level of interest of the game as a result of lowering the difficulty level.

(F) A method for preventing cheating executed by the game system is included in the scope of the present invention. Further, a program executing a cheating prevention method and a computer-readable recording medium recorded with this program are included in the scope of the present invention. Here, "program" includes that stored in the recording medium and that which it is possible to download. A computer-read/writable flexible disk, a hard disc, a semiconductor memory, a CD-ROM, a DVD, a magneto-optical disc (MO), and others can be given as recording media.

INDUSTRIAL APPLICABILITY

The present invention is applicable to all fields where the position of an object is detected in space, and is suited to the field of gaming.

The invention claimed is:

1. A game device with a cheating prevention function where a plurality of players can participate in a game together, comprising:
  a players-setting unit being configured to receive a setting for a plurality of players that are to participate in the game;
  a game-execution unit being configured to execute the game using the set number of players received by the players-setting unit;
  a players-detection unit being configured to detect a number of players constituting the plurality of players participating in the game;
  a difficulty-level-control unit being configured to compare the plurality of players detected by the players-detection unit and the set number of the plurality of players and to control the difficulty level of the game; and
  a supply unit connected to the game device, the supply unit supplying real objects handled by the plurality of players during the game to the plurality of players;
  the difficulty-level-control unit sends a supply-amount-control command to the supply unit in accordance with the comparison results,
  the supply-amount-control command controlling an amount of the real objects supplied to the supply unit; and
  the supply unit supplies the amount of real objects according to the supply-amount-control command from the difficulty-level-control unit.

2. The game device with a cheating prevention function according to claim 1, wherein the game-execution unit stores a quota imposed on the players and proceeds with the game based on the quota;
  the difficulty-level-control unit sends a quota change command instructing change of the set quota to the game-execution unit in accordance with the comparison results; and
  the game-execution unit changes the quota as the game progresses according to the quota change command.

3. The game device with a cheating prevention function according to claim 1, wherein the game-execution unit determines whether or not game objects moving within the game space displayed on the monitor are hit by real objects operated by the plurality of players during the game;
  the difficulty-level-control unit sends a speed-change-command instructing changing of a speed of movement of the game objects to the game-execution unit in accordance with the comparison results; and the game-execution unit changes the speed of movement of the game objects according to the speed-change-command.

4. The game device with a cheating prevention function according to claim 1, wherein the game-execution unit determine whether or not game objects within the game space displayed on the monitor are hit by real objects operated by the plurality of players during the game to a predetermined degree of accuracy;

the difficulty-level-control unit sends an accuracy-change command instructing to change the accuracy to the game-execution unit in accordance with the comparison results; and the game-execution unit changes the accuracy of the hit determination according to the accuracy-change command from the difficulty-level-control unit.

5. The game device with a cheating prevention function according to claim 1, wherein the game-execution unit determines whether or not the game objects are hit by the real objects based on positions where game objects within the game space are displayed on the monitor, and positions where real objects operated by the plurality of players hit the monitor during the game; and the players-detection unit comprises a measuring unit and a players-deciding unit, the measuring unit measuring a plurality of hits per unit time for the real objects hitting the monitor; and the players-deciding unit deciding a plurality of players operating the real objects based on the measurement results of the measuring unit and a reference hits per unit time.

6. A method for preventing cheating during a game executed by a game device enabling a plurality of players to participate in a game together, comprising the steps of:

receiving a setting for a number of the plurality of players that are to participate in the game;

executing the game using the set number of the plurality of players received by the players-setting step;

detecting a number of players constituting the plurality of players playing the game;

comparing the detected number of the plurality of players and the set number;

supplying real objects handled by the plurality of players during the game to the plurality of players; and controlling the difficulty level of the game based upon the comparing of the detected number of players with the set number by changing an amount of the real objects supplied to the plurality of players.

7. A non-transitory computer readable medium storing a program for preventing cheating during a game executed by a game device enabling a plurality of players to participate in a game together, causes the game device to function as:

a players-setting unit being configured to receive a setting for a number of the plurality of players that are to participate in the game;

a game-execution unit being configured to execute the game using the set number of players received by the players-setting unit;

a players-detection unit being configured to detect a number of players constituting the plurality of players participating in the game;

a supply unit supplying real objects handled by the plurality of players during the game to the plurality of players; and a difficulty-level-control unit being configured to compare the number of the plurality of players detected by the players-detection unit and the set number of the plurality of players and controls the difficulty level of the game by changing an amount of the real objects supplied to the plurality of players.

* * * * *